United States Patent [19]

Raleigh et al.

[11] Patent Number: 5,257,461
[45] Date of Patent: Nov. 2, 1993

[54] COORDINATE MEASURING MACHINE CONSTRUCTION

[75] Inventors: Freddie L. Raleigh, Centerville; Robert W. Brandstetter, Fairborn; Frederick K. Bell, Centerville; Donald K. Greier, Dayton; Thomas L. Hemmelgarn, Vandalia, all of Ohio

[73] Assignee: Warner & Swasey, Dayton, Ohio

[21] Appl. No.: 874,260

[22] Filed: Apr. 27, 1992

[51] Int. Cl.$^5$ .............................. G01B 5/03
[52] U.S. Cl. .............................. 33/503; 33/1 M
[58] Field of Search ............... 33/503, 1 M, 504, 505, 33/DIG. 2

[56] References Cited

U.S. PATENT DOCUMENTS

| | | | |
|---|---|---|---|
| 4,594,791 | 6/1986 | Brandstetter | 33/503 |
| 4,651,439 | 3/1987 | Band et al. | 33/503 |
| 4,682,418 | 7/1987 | Tuss et al. | 33/503 |
| 4,763,420 | 8/1988 | McCabe et al. | 33/1 M |
| 4,852,267 | 8/1989 | Tezuka | 33/503 |
| 4,887,360 | 12/1989 | Hemmelgarn et al. | 33/503 |
| 4,958,437 | 9/1990 | Helms | 33/503 |
| 5,086,564 | 2/1992 | Schalz | 33/1 M |
| 5,130,523 | 7/1992 | Raleigh et al. | 33/1 M X |

FOREIGN PATENT DOCUMENTS

| | | | |
|---|---|---|---|
| 0150950 | 8/1985 | Japan | 33/1 M |
| 1167413 | 7/1985 | U.S.S.R. | 33/503 |

Primary Examiner—William A. Cuchlinski, Jr.
Assistant Examiner—Alvin Wirthlin
Attorney, Agent, or Firm—John R. Benefiel

[57] ABSTRACT

A coordinate measuring machine is described including a vertical probe shaft mounted on an X-axis carriage in turn mounted on a Y-axis carriage for movement along three orthogonal axes, in which the Y-axis carriage is guided and supported on a first guide beam fixed extending along one side of a machine base with air bearings mounted to the lower end of one upright engaging all four sides of the first guide beam. The Y-axis carriage is also supported on a second guide beam fixed extending along the other side of the base, with air bearings mounted to the lower end of the other upright engaging only the top and bottom surfaces. A lower crossmember beam connects the lower ends of the upright to increase stiffness of the Y-axis carriage. A cast aluminum table is supported on the base with three cast in support features projecting from the underside, configured to minimize thermal distortion, with a steel plate bonded into a recess in the upper surface. A particular releasable lead screw drive for the carriages and probe shaft is described as well as a counterbalance for the probe shaft, and a preloading pin assembly for some of the air bearings.

10 Claims, 10 Drawing Sheets

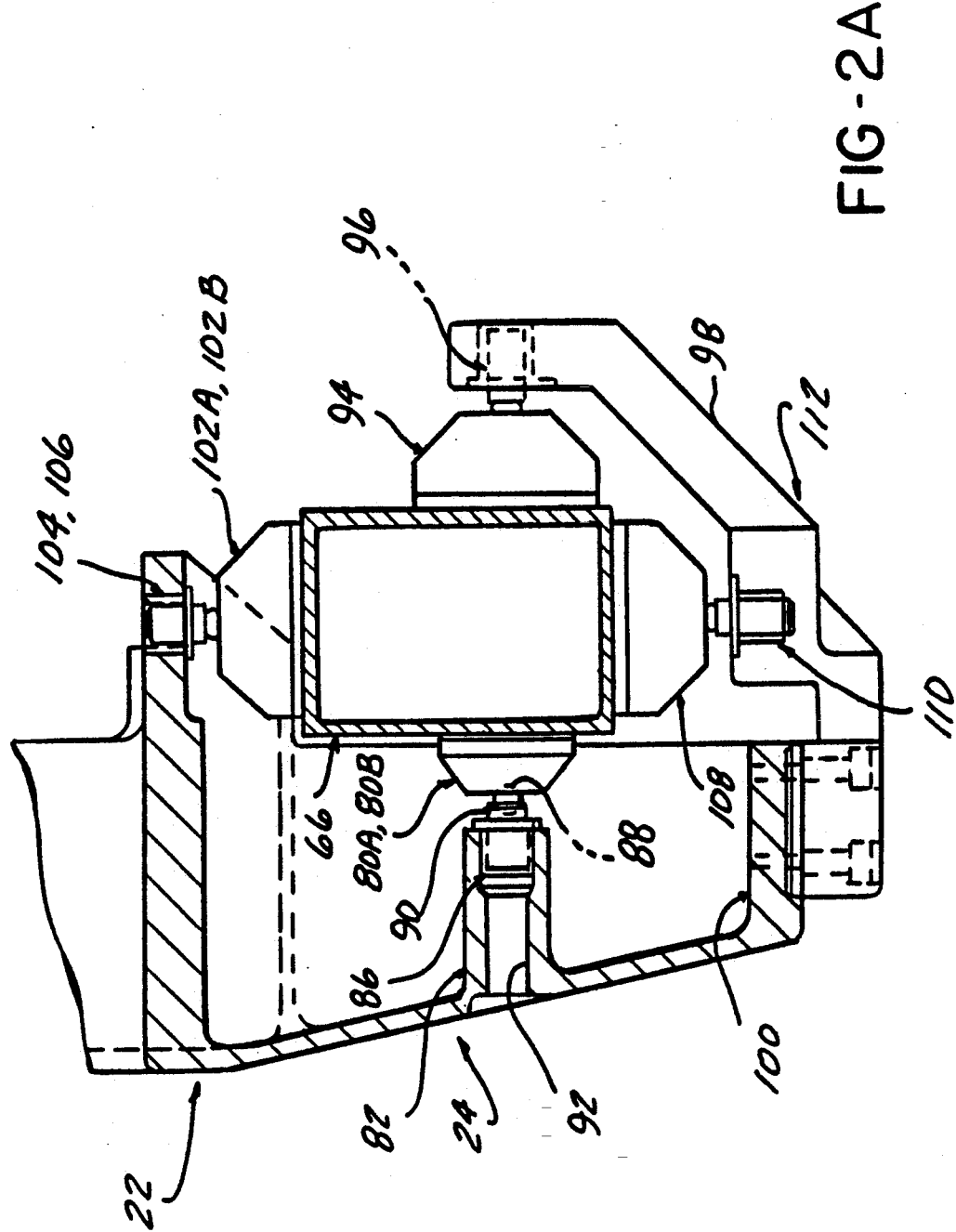

COORDINATE MEASURING MACHINE CONSTRUCTION

BACKGROUND OF THE INVENTION

This invention concerns coordinate measuring machines.

Coordinate measuring machines (referred to as CMM's) are well known and in widespread industrial use. A CMM consists of a probe supported for movement along three orthogonal axes above a table on which an object to be measured is supported. The extent of movement of the probe along each axis is measured precisely by transducer devices generating corresponding electrical signals, such as Moire' fringe gratings and photocell arrangements or laser beam interferometers. This arrangement allows measurements to be made by movement of the probe tip between points of interest on an object to be measured, by processing of the electrical signals to calculate the distances between points from the extent of movement of the probe.

It is important that the probe be supported so as to not generate frictional or misalignment forces tending to deflect the support members, particularly in a nonrepeatable fashion, as the accuracy of measurement depends on precise correspondence between the probe tip movement and movement of the structure carrying the probe during each movement.

One form of CMM comprises a vertically extending probe mounted for movement along a vertical axis (here referred to as the Z-axis) on a first or probe carriage. The probe carriage is itself in turn mounted for movement in a first horizontal direction, here referred to as the X-axis, on a horizontal beam extending across and above the table.

The horizontal beam forms a part of a second carriage supported for movement along a second horizontal axis (here referred to as the Y-axis).

The Y-axis carriage consists of a pair of uprights straddling the table and supported on air bearings and fixed ways.

In an effort to improve the rigidity of the Y-axis carriage, a lower cross member has heretofore been added, connecting the lower ends of the uprights. See U.S. Pat. Nos. 4,594,791 and 4,630,374 for examples of such designs.

The table has usually been constructed of a rigid material such as steel to avoid distortions caused by the weight of heavy objects to be measured, while the carriages are constructed of a lightweight material such as aluminum to be as lightweight as possible to improve performance when servo drives are employed. The table is supported on a base, the base forming the ways on which the Y-axis carriage moves, as in the above U.S. patents. The base is often also constructed of a lightweight material such as aluminum, different from that of the table.

The Y-axis carriage support and guide bearings have heretofore been provided on the sides of the base as shown in the above cited U.S. patents. This leads to difficulties, particularly if diverse materials are used in the carriage and base due to differences in the coefficient of thermal expansion. Even if the same material is used, differences in mass or in exposure to transient conditions can create transitory differences in thermal growth. The guide bearings engage widely spaced vertical way surfaces in these described prior designs, the wide spacing accentuating differences in thermal growth such that loss of the necessary air gap can result.

The guide ways must be very accurately matched to each other to insure accuracy, and with guide surfaces on either side of the base, these must usually be machined while fixed or integral with the base itself necessitating a large machining apparatus with increased manufacturing costs.

Where four bearings are used in each set, the machining accuracy requirements are particularly acute, since the way surfaces must be precisely located in parallel planes to prevent interferences.

U.S. Pat. No. 4,610,089 describes a center guide rail design intended to alleviate this problem by using a central rail having vertical guide surfaces thereon and affixed to the base or the underside of the table.

U.S. Pat. Nos. 4,852,267 and 4,763,420 show X-axis carriages, lacking a lower cross member, which are guided with an asymmetric guide surface arrangement, in which vertical guide surfaces are located on one side of the table or base only, and horizontal support surfaces only are formed on the opposite ways.

USSR patent 621955 shows an asymmetric bearing arrangement for a Y-axis carriage which also has a lower cross member passing beneath the table.

It is the object of the present invention to provide a lower cost construction coordinate measuring machine while ensuring adequate accuracy and freedom from thermal growth problems.

SUMMARY OF THE INVENTION

The present invention comprises a coordinate measuring machine construction in which a pair of parallel Y-axis guide beams, preferably aluminum extrusions, are fixed at either end to anchor seats forming a part of the base, preferably by being bonded therein. The ends of the guide beams are located on accurately machined locating surfaces on the anchor seats. The lower end of one of the uprights of the Y-axis carriage is provided with bearing means engaging all four sides of one of the guide beams. This includes two guide air bearings facing one vertical surface of one of the Y-axis guide beams, with a centered preload bearing centered on the opposite side of the one Y-axis guide beam. Additionally, a pair of downwardly facing support air bearings are included arranged along the top surface of the one Y-axis guide beam, with a preload bearing centered on the under surface. Thus, two three bearing sets are used, one for guiding and one for support of the carriage.

A lower cross beam is fixed extending between the lower ends of each upright, having respective ends received and bonded in a recess in either upright located intermediate the table and the base. The lower crossmember is configured to be rigid to bending in the horizontal plane, to increase resistance to twisting of the guide upright, increasing the stiffness of the Y-axis carriage structure in this regard.

The other upright mounts a single downwardly facing air bearing arranged along the machined top surface of the other Y-axis guide beam with a single preload air bearing facing up against the under surface of the other Y-axis guide beam.

The cast aluminum table is spaced above the base on three support features projecting down from the underside, the support features configured to allow slight differences in thermal growth between the table and base, to minimize thermal distortion. The lower cross beam moves through an intermediate space created between the table and base by the supports, as the Y carriage moves along the Y-axis.

A steel insert is bonded in a recess within the top of the aluminum casting forming the table structure.

The cast aluminum base is also supported on a stand with a three point isolator aligned with the three table supports.

A special preload pin assembly is employed for each preloaded bearing, threaded in a bushing mounted to the supporting structure.

A particular lead screw releasable carriage and probe shaft drive is provided, as is a probe shaft counterbalance.

DESCRIPTION OF THE DRAWINGS

FIG. 2A is an enlarged fragmentary front view of the bearing arrangement and guide rail shown in FIG. 2.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
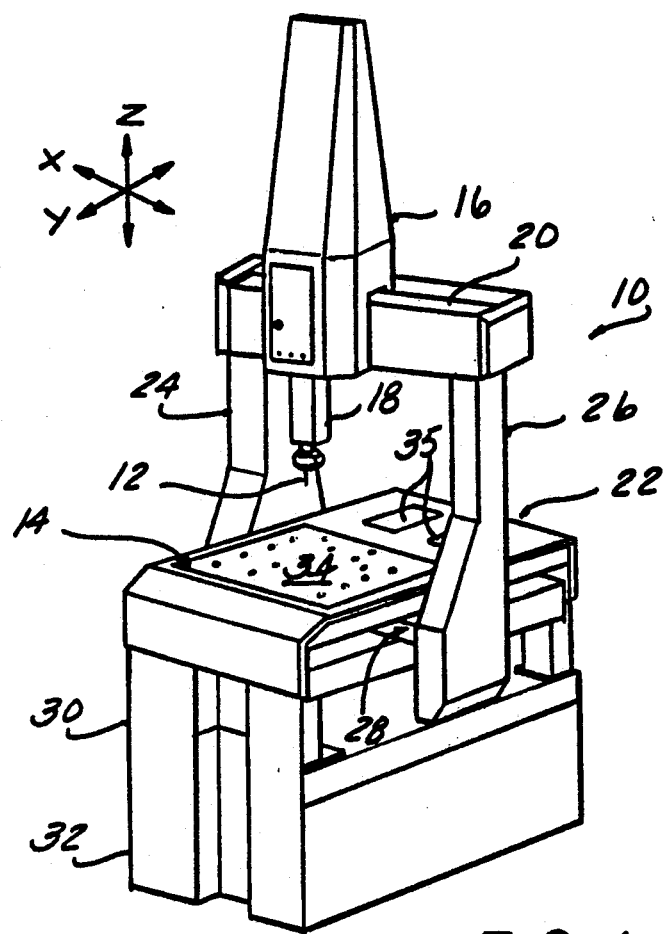
FIG. 1 is a perspective view of a coordinate measuring machine according to the present invention.
Figure 4:
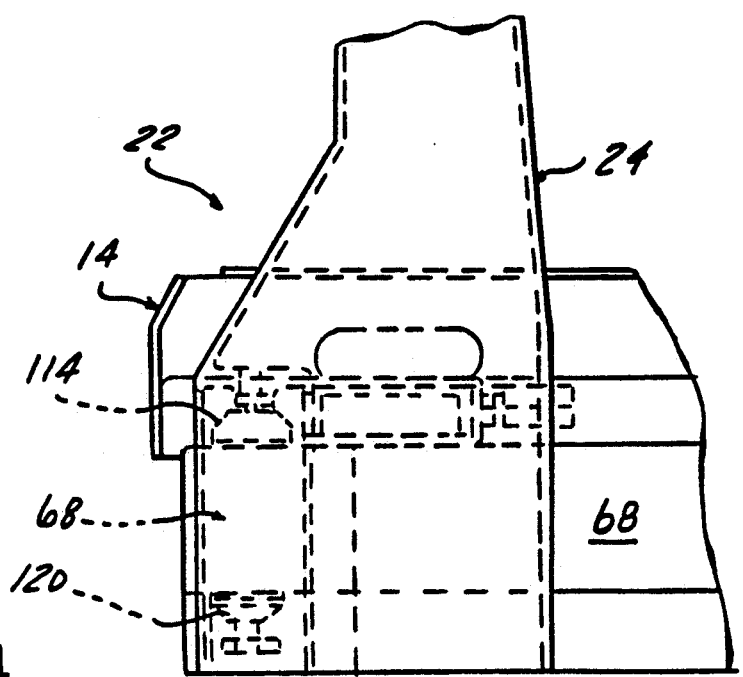
FIG. 4 is a right side fragmentary view of the CMM portions shown in FIGS. 2 and 3.

Referring to the Drawings, and particularly FIG. 1, a coordinate measuring machine 10, according to the present invention is shown, in which a probe 12 is supported above a table 14 for movement along three orthogonal axes. The two horizontal axes are designated X and Y axes, and the vertical as the Z axis, as indicated.

An X-axis carriage 16 supports a probe shaft 18 for vertical movement, while the X-axis carriage 16 is in turn supported for horizontal movement on a horizontal axis beam 20.

X-axis beam 20 forms an upper connecting member of a Y-axis carriage 22 having a pair of vertical uprights 24, 26 each fixed to a respective end of the X-axis beam 20. The lower end of each upright is connected together by a lower crossmember 28, to be described further hereinafter, passing beneath the table 14.

The Y-axis carriage 22 is supported and precisely guided for movement along the Y-axis on a pair of parallel horizontal beams to be described fixed to a base 30 on which the table 14 is supported.

The base 30 in turn is mounted atop a framework stand 32.

An object to be measured is placed on a steel insert 34 recessed into the upper surface of the table 14, and the probe tip moved between points of interest on the object, by causing movements as necessary of the probe shaft 18, X-axis carriage 16, and Y-axis carriage 22 in the general manner now well known in the art.

Access openings 35 with suitable covers on the rear of the table 14 enable access to the reading heads and cables of the measuring transducers without requiring removal of the table 14.

The movement of the probe tip may be accomplished manually or by a servo drive of the carriages and probe shaft under computer program or joystick control as well known in the art. Many drive arrangements for this application are known, see for an example U.S. Pat. No. 4,928,396.

The lower crossmember 28 allows a more centered location for the application of the drive force on the Y-axis carriage 22 than a carriage without the lower cross member to reduce forces, lowering the loading of the guide bearings.

A lead screw drive is contemplated for use with this machine to improve stiffness over belt drives as shown in U.S. Pat. No. 4,928,396, suitable such drives available from KERK MOTION PRODUCTS, INC. of Hollis, N.H., in which the nut is preloaded and a coated thread lead screw is employed. Preferably, an air pressure operated nut clamp is employed to allow release of the lead screw driving connection for manual movement of the carriage and probe shaft.

Figure 18:
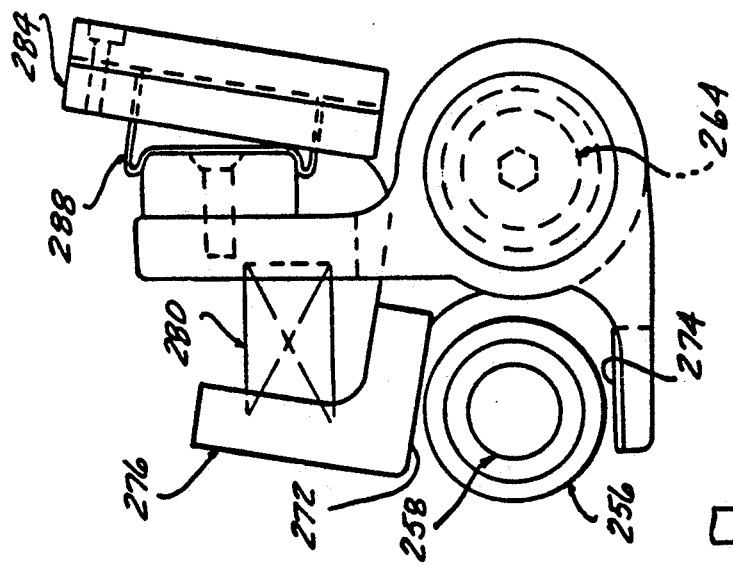
FIG. 18 shows the clamping device in the released condition.
Figure 17:
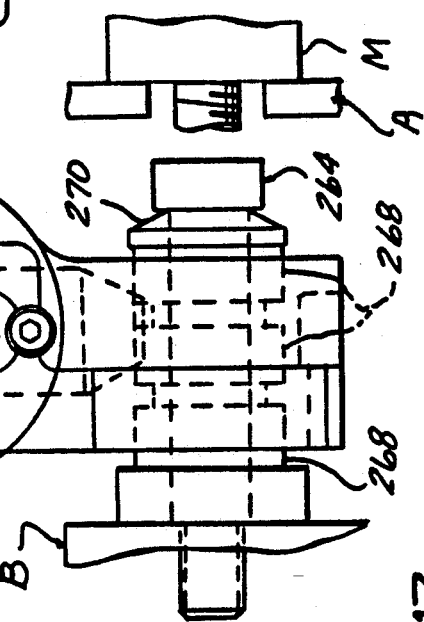
FIG. 17 is a side view of the clamping device shown in FIG. 16 and associated lead screw components.
Figure 16:
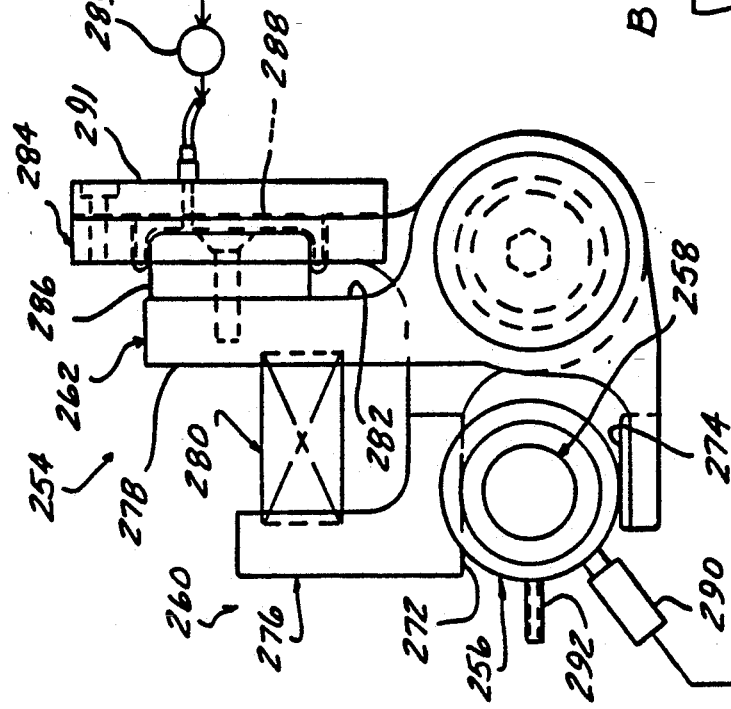
FIG. 16 is an end view of a clamping device and lead screw-drive nut drive components for the probe shaft and carriages, depicting the clamped condition.

FIGS. 16–18 show a releasable clamp device 254 mounted on the carriage (or probe shaft) to be driven, and is associated with a drive nut 256 caused to be advanced by rotation of a lead screw 258, as by energization of an electrical drive motor mounted to the structure A, fixed with respect to the movable structure to be driven B. The movable structure here are the probe shaft 18, X or Y axis carriages 16, 22 with respective relatively fixed structures, the X-axis carriage 16, Y-axis carriage 22, and base 30. The clamp device 254 includes a pair of clamping members 260,262 pivoted together about a pivot axis defined by a shoulder bolt 264 threaded into the structure to be driven. A swivel washer 266 and three thrust bearings 268 preloaded with a Belleville washer 270 allow free pivoting of the clamping members 260, 262 while absorbing of axial loads imposed by drive of the lead screw 258.

The clamping members 260, 262 are formed with opposing clamping jaw portions 272, 274 positioned on either side to grip the drive nut 256 when the members are pivoted about the shoulder bolt 264 so as to bring the jaw portions 272, 274 towards each other.

Tail portions 276, 278 are formed on each clamping member 260, 262 with an interposed clamping spring 280 normally urging the jaw portions 272, 274 into gripping engagement with the drive nut 256.

The reverse side 282 of tail portion 278 faces a releasing tail portion 284 of clamping member 260. A piston 286 is fixed to reverse side 282 on which is secured the center of a rolling lip diaphragm 288, the periphery clamp beneath a cap 291 fastened to releasing tail 284. Pressurization of interior chamber defined by the diaphragm 288 by opening valve V 289 to allow communication of the air pressure source 287 causes the reverse side and releasing tail portion 284 to be separated as shown in FIG. 18, compressing spring 280 and separating jaw portions 272, 274 to release the drive nut 256. This disconnects the driven structure (carriage or probe shaft) to allow free wheeling manual movement thereof.

In order to insure a defined release location so that the structure is in a known position when released or reengaged, a pair of microswitches 290 may be employed one on the drive nut 256, one on the drive structure which are tripped when the drive nut 256 and carriage are at the end of their travel. Such switches are interlocked in a control 294 to prevent opening valve V to preclude unclamping or clamping of the drive nut 256 except when in the end position. This will insure that the carriage and nut 256 are in a known position when released or reengaged. A set screw 292 carried by a bracket (not shown) engages a flat on the drive nut 256, to prevent the drive nut from rotating to change its angular position and cause slight axial movements.

The probe shaft is equipped with a suitable counterbalance, as described in U.S. Pat. No. 4,799,316. That design is contemplated for use in the present machine except that the ball piston shown in that patent is attached to a spring directly attached to the lower end of the supply tube as in U.S. Pat. No. 4,799,316. The spring mount allows an additional ability to accommodate misalignments without creating binding forces.

Figure 1A:
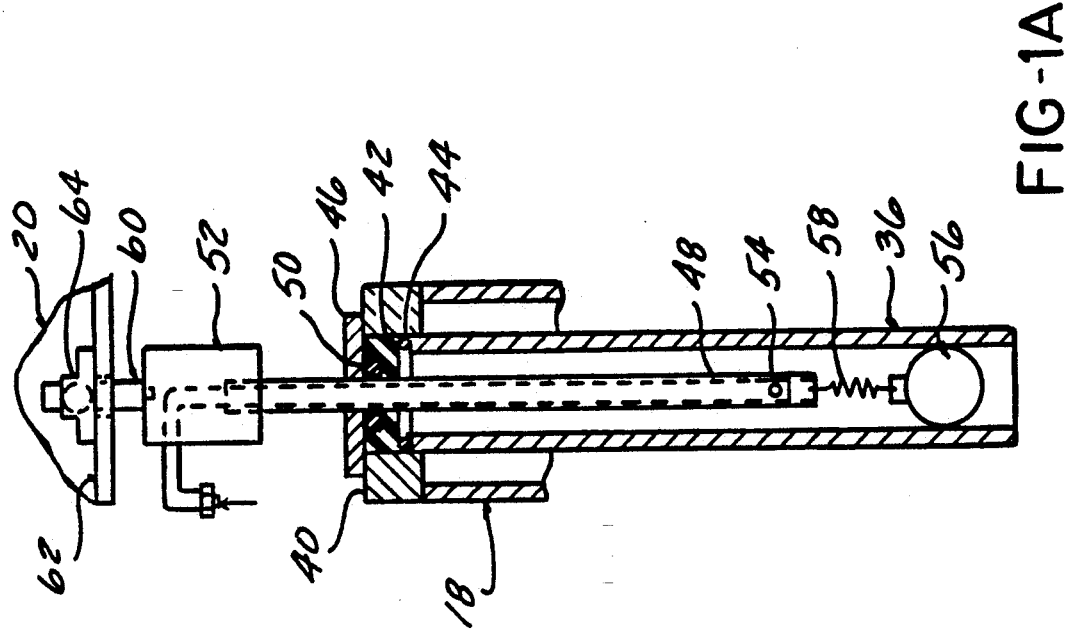
FIG. 1A is a fragmentary, partially sectional view of a counterbalance arrangement for the probe shaft.

This is shown in FIG. 1A in which the probe shaft 18 has an inner tube 36 slidably receiving a piston 56. The probe shaft 18 is affixed to cap 40 having an opening fixedly receiving the inner tube 36 which is sealed against a seal block 42 with an O-ring 44. The seal block is retained with a retainer plate 46 mounted atop the cap 40.

A supply tube 48 slidably passes through the cap opening, with a wiper seal 50 sealing the outside diameter of the supply tube 48, a slight clearance enabling formation of an air film to reduce friction.

The protruding upper end of the supply tube 48 is attached to a mounting block 52 having an internal passage opening into the interior of the supply tube 48 and receiving an air supply fitting so that pressurized air from a regulated source can be supplied to the interior of the air supply tube 48.

One or more openings 54 allow the egress of air to pressurize the space above the spherical piston 56 slidably fit to the interior of the inner tube 36 preferably with a clearance allowing an air film to be formed to reduce friction. The spherical piston 56 is mounted by means of a stiff spring 58 attached at one end to the lower end of the supply tube 48 and at the other end to the spherical piston 56.

The upper end of the supply tube 48 is supported by a shoulder screw 60 threaded into the supply block 52 and extending through an opening in a support plate 62 forming part of the X-axis carriage 20.

A swivel bearing assembly 64 supports the shoulder screw 60.

Thus a regulated air supply may be used to pressurize the space sufficiently to just counterbalance the weight of the probe shaft 18 and attachment, the supply tube 48 placed in tension by the pressurized chamber to support the weight of the probe shaft 1 and attached structure.

A suitable electro optical transducer arrangement is employed to generate electrical signals corresponding precisely to the extent of movement along each axis, such as the well known Moire' fringe grating and photocell arrangements. Since the details of the electrical signal generating, processing and display techniques do not form a part of the present invention, and are well known in themselves, no description is here set forth. Preferably, a technique for recording repeatable deviations to correct measurements is used with this machine, as described in U.S. Pat. No. 4,945,501.

Figure 2B:
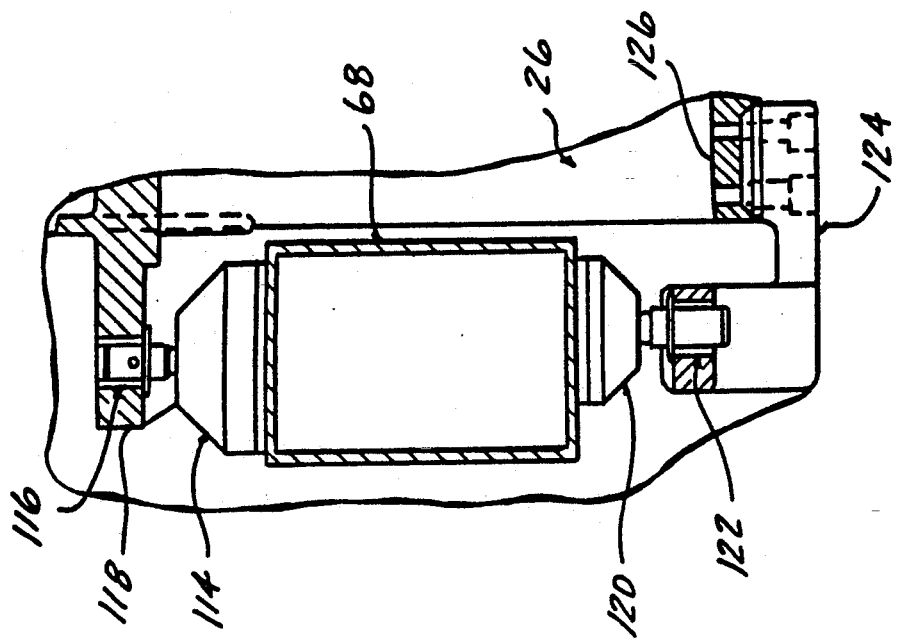
FIG. 2B is a fragmentary front view of the bearing guide rail of the other side of the Y-axis carriage shown in FIG. 2.
Figure 2:
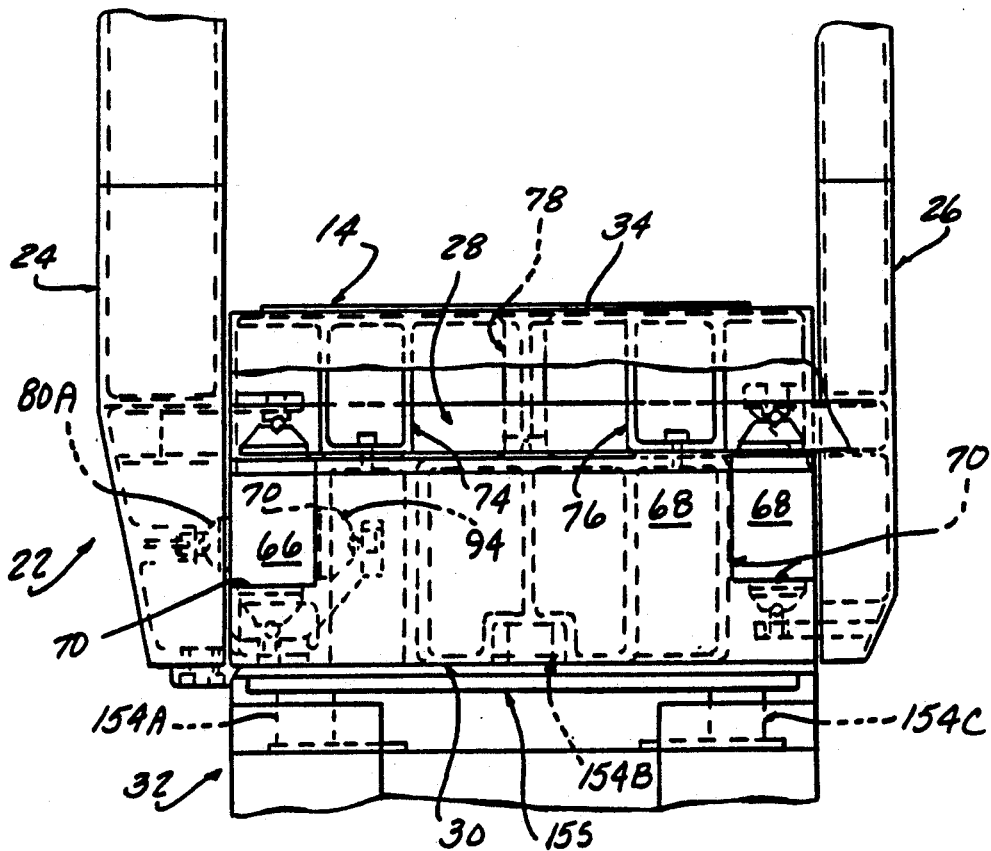
FIG. 2 is a fragmentary front view of the table and base as well as the lower portion of the Y-axis carriage of the CMM shown in FIG. 1.

Referring to FIG. 2, the Y-axis carriage 22 is supported and guided on a pair of guide beams 66, 68 fixed parallel to each other on either side of base 30.

Each guide beam 66, 68 is preferably constructed as a hollow aluminum extension and is bonded to an anchor seat 70 configured at each corner of the cast aluminum base 30 and the beams 66, 68 spanning the distance between the anchor seat portions of the base 30.

These guide beams 66, 68 are contemplated as preferably being "hard coated" by commercially available processes which add a Teflon (TM) layer to the beam surfaces, such coating is resistant to scratching by incident bearing contact when the air film is penetrated or not present. An upper space 72 is provided between the top of each beam 66, 68 and the underside of the stiffener ribs of the cast aluminum table in order to allow support bearings and their support structure to move along the upper surface of the beams 66, 68. Clearance for the Y-axis carriage lower cross member 28 is also afforded as the Y-axis carriage 22 is traversed between the forward two table supports 74, 76 and a rear post support 78.

Similarly, the undersurface and each side of the left guide beam 66 is clear between the ends thereof to enable the bearings and supporting structure to move along these surfaces.

Referring to FIGS. 2A-2B, the bearing arrangement associated with each upright of the Y-axis carriage 22 can be seen in detail.

Figure 3:
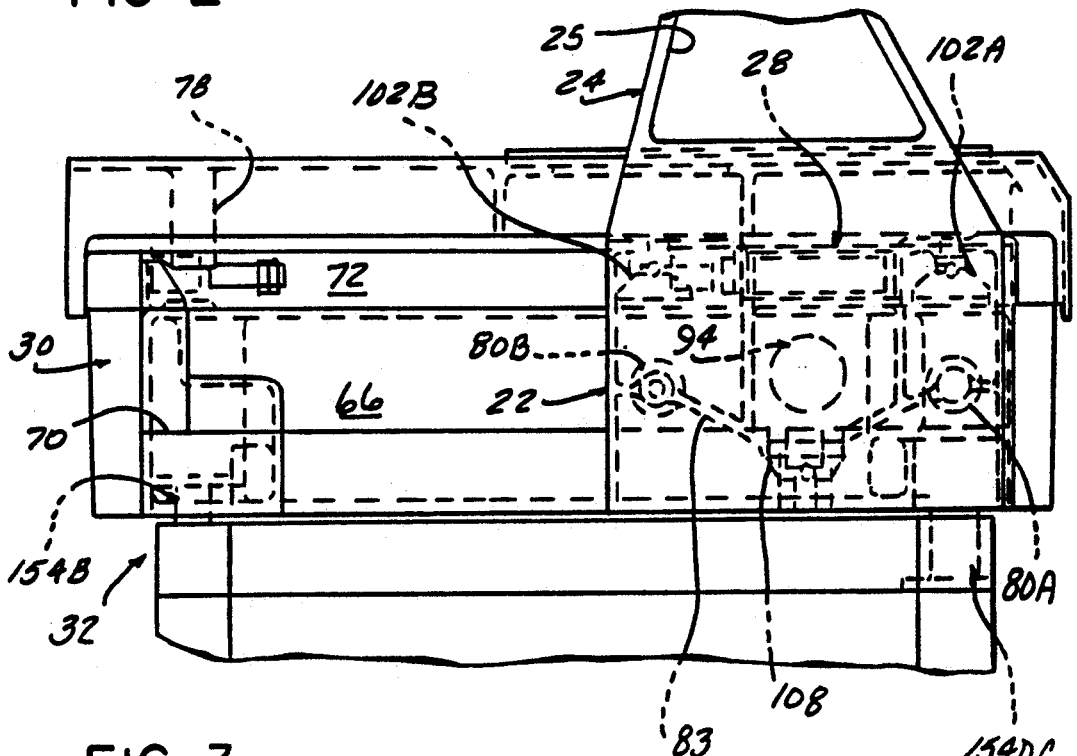
FIG. 3 is a left side fragmentary view of the CMM portions shown in FIG. 2.

The bearing arrangement supported by the left side of the Y-axis carriage 22 as viewed in the drawing performs the guiding function, and hence a pair of horizontally spaced guide air bearings 80A, 80B (FIG. 3) are mounted on an inwardly facing pedestal 82 cast into the upright 24 with supporting webs 83 (FIG. 3). These bearings 80A, 80B are supported by a support pin assembly 86 received in the pedestal 82.

Such air bearings are well known in the art, including a regulated pressure air supply directed to flow through a porous cap of graphite to create an air film between a slight clearance between the surface of the guide beam 66 and the bearing face, with a slight, self aligning effect created by the ball 88 at the base of each bearing.

In the arrangement shown, the bearings 80A, 80B are also adjustable by means of a threaded adjustment of a pin 90, accessible through an opening 92 in the pedestal 82 so machine squareness can be precisely adjusted.

A single preload bearing 94 is provided in the opposite face of the guide rail 66 centered therebetween. This preload bearing 94 is intended to load the guide bearing 80A, 80B to a predetermined load and stiffness, while allowing a degree of compliance to accommodate thermal growth and slight misalignments of the guide surfaces and bearings. This is accomplished by an adjustable spring loading of the bearing 94 with a preloading pin assembly 96 mounted in an opposing portion of a support backer 98 attached to a web 100 at the bottom of carriage arm 24.

The preloading pin assembly 96 is described below in further detail.

A pair of horizontally spaced support bearings 102A, 102B are mounted above the guide rail 66 with one adjustable pin assembly 104 and one fixed pin assembly 106 mounted in respective brackets cast into the carriage upright 24 and extending over the top of the guide rail 66.

A single preload bearing 108 is mounted beneath the guide rail 66 centered between the support bearings 102A, 102B. A preloading pin assembly 110 is mounted in an intermediate section 112 of the bracket 98.

The bearing arrangement of the right upright 26 includes only a single support bearing 114 disposed above the right side guide beam 68, mounted on an adjustable pin assembly 116 received in an upper bracket 118 cast into the right side upright 26. A single preload bearing 120 is aligned beneath the support bearing 114 facing the undersurface of the guide beam 68, mounted on a preloading pin assembly 122 received in a lower bracket 124 affixed to a bottom web 126 of the right upright 26.

The guiding forces are thus absorbed only by the left side upright 24, with only the width of the left guide beam 66 contributing to the thermal effects described above.

The three bearing combinations 80A, 80B and 94, and 102A, 102B and 108 as well as the asymmetric guide bearing design allow relaxed alignment requirements between the two guide beams 66, 68.

The right side bearing 114 need only absorb the roll forces and support a lesser proportion of the weight of the Y-axis carriage.

The right side upright 26 does not absorb any substantial twisting forces which are absorbed mainly by the left upright 24, which must be rigid in torsion and hence is configured of substantially greater size.

Figure 2C:
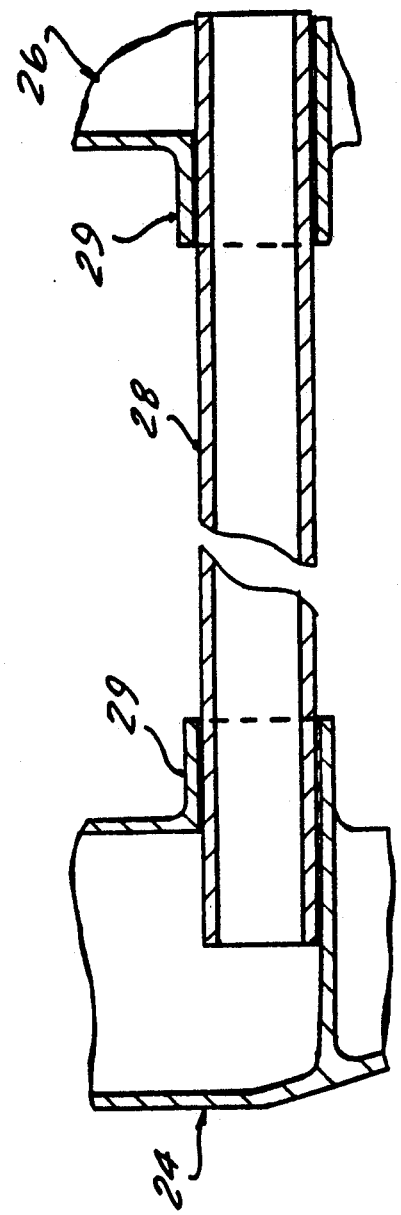
FIG. 2C is a sectional, fragmentary view of the Y-axis carriage showing the fixing of the lower cross member.

The cross member 28 assists in stiffening the Y-axis carriage against deflections caused by the asymmetric guiding forces, and is preferably configured as a hollow beam of substantially greater width, that is, is wider in the plane of the table 14 to strongly resist bending in the horizontal plane and thus resist twisting of the left Y-axis carriage upright 24. The cross beam 28 is received and bonded in corresponding recesses formed by a flange 29 cast in the walls of each upright forming a perimeter around the beam edge (FIG. 2C).

The guide beams 66, 68 are contemplated as having their bearing surfaces ground prior to assembly onto the base 30 as the single guide beam and three point bearing sets.

A relaxation of guide beam parallelism requirements is assisted by the use of the spring loaded pin assemblies 96, 110, 122.

Figure 8:
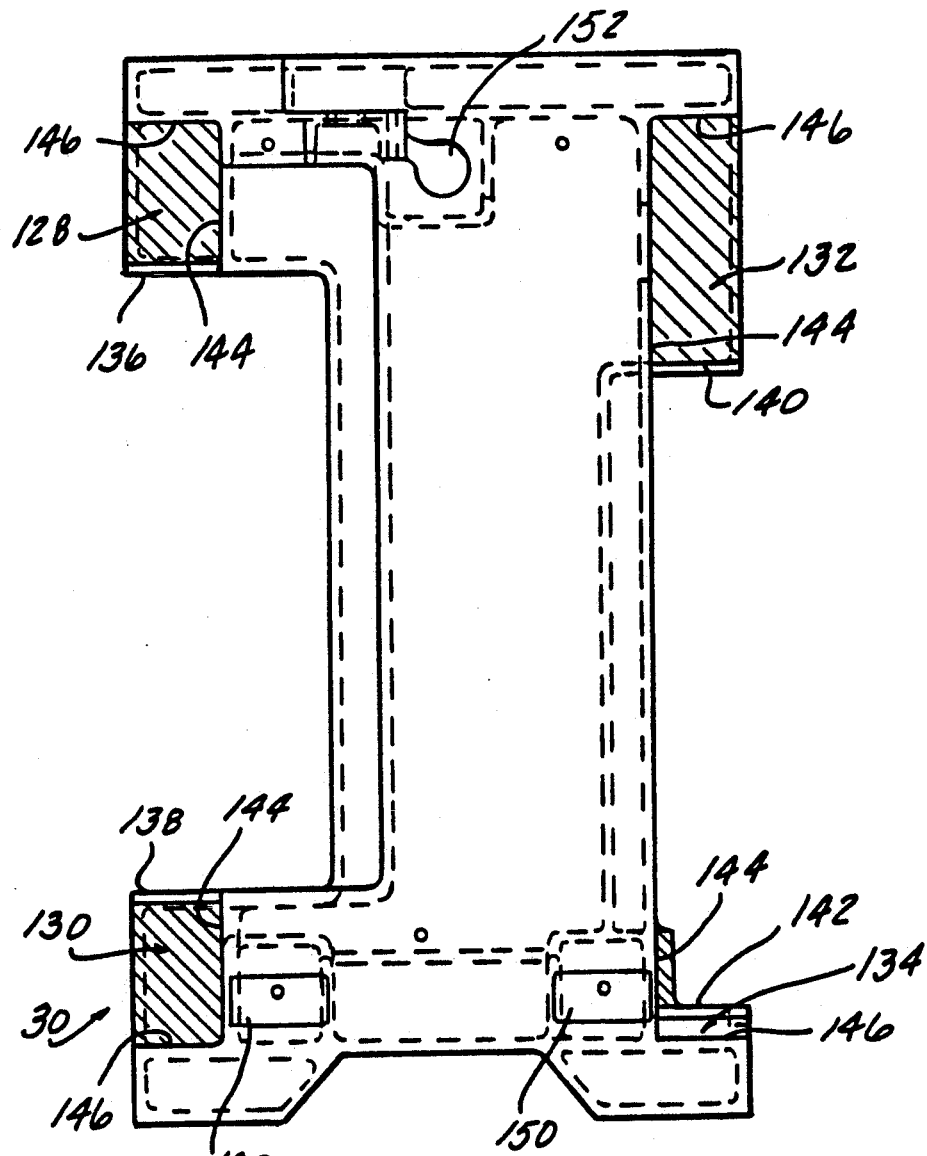
FIG. 8 is a plan view of the base incorporated in the CMM shown in FIG. 5.
Figure 9:
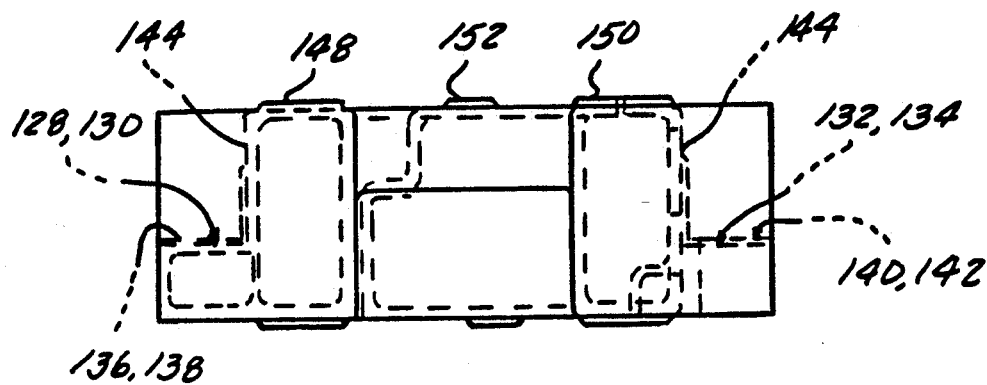
FIG. 9 is an end view of the base shown in FIG. 8.

The cast aluminum base 30 is shown in FIGS. 8 and 9, prior to assembly of the guide beams 66, 68. The base 30 provides pairs of anchor seats 128, 130 and 132, 134 in each corner, into which is to be bonded a respective end of a guide beam 66 or 68. Each beam end is located on a raised strip 136, 138 and 140, 142, which are precisely machined to be coplanar.

The areas 128, 130, 132, 134 are slightly depressed (shown cross hatched) and can receive a bonding agent such as an epoxy adhesive, which is also applied to lateral end end surfaces 144, 146 of each anchor seat. A suitable adhesive is Phillybond TA-30 available from PHILADELPHIA RESINS CORPORATION of Montgomeryville, Pa., which may also be used to bond the lower cross member 28 to the Y-axis carriage 22.

Also accurately machined are surface areas 148, 150, 152 designed to precisely align the mounting features of the table 14 with respect to the plane of the horizontal surfaces of the guide beams 66, 68.

The base 30 is supported on the stand 32 on two front isolator pads 154A, and, 154C engaging a bar 155, and a rear isolator 154B engaging a pocket in the bottom of the base 30, best seen in FIGS. 2 and 3.

Figure 5:
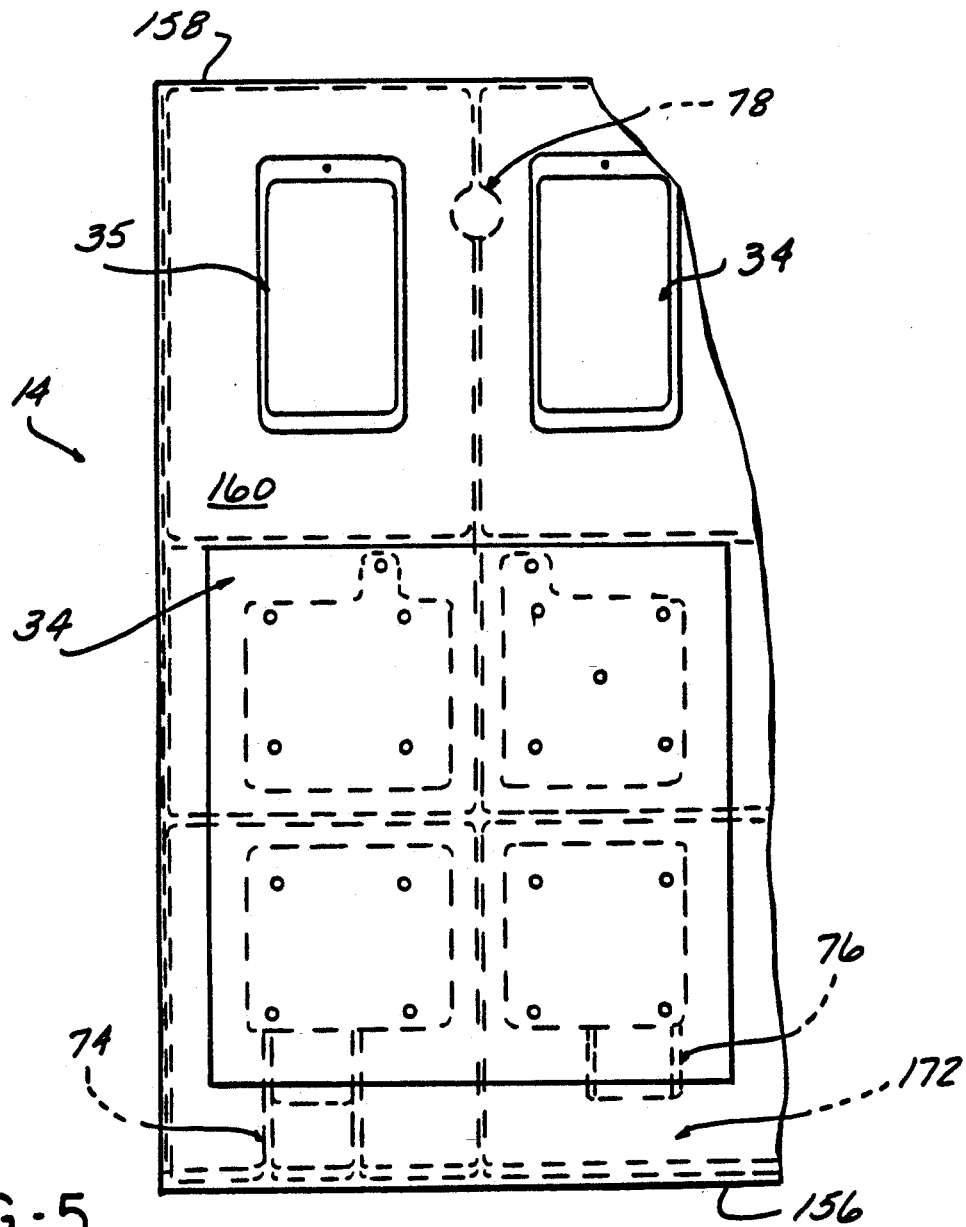
FIG. 5 is a fragmentary plan view of the table incorporated in the CMM shown in FIG. 1.
Figure 6:
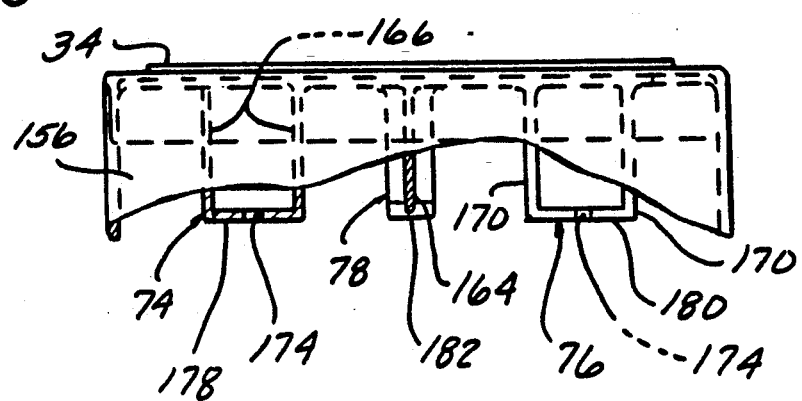
FIG. 6 is an end view of the table shown in FIG. 5, with portions broken away.

Referring to FIGS. 5 and 6, further details of the cast aluminum table 14 can been seen.

Front and rear skirt portions 156, 158 extend downwardly from the rectangular top 160 to cover the gap created by three integrally cast support features approximately aligned with the base isolators 154A, 154B, 154C, a rear post 78 braced by a central web 164, and left and right spaced web supports 74, 76 all projecting downwardly from underneath the table top 160.

The support features 178, 180, 182 mate with the corresponding surfaces 148, 150, 152 on the base 30 and establish a three point support of the table 14 on the base 30 in generally similar fashion to that described in U.S. Pat. No. 4,682,418 and copending U.S.S.N. 07/688,754 filed on Apr. 22, 1991. That is, in a manner tolerating transitory differences in thermal expansion of these structures tending to cause distortions.

In this case, left web support 74 acts as a fixed support, since the webs 166 extend into the front skirt 156 so as to be rigid to side and front to rear forces.

Figure 7:
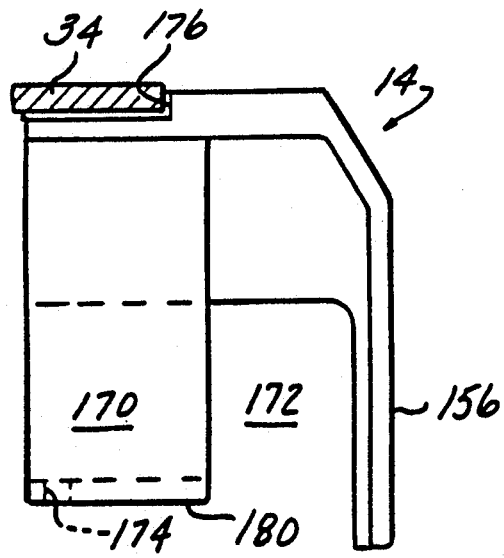
FIG. 7 is an enlarged sectional elevational view of a portion of the table shown in FIG. 5.
Figure 13:
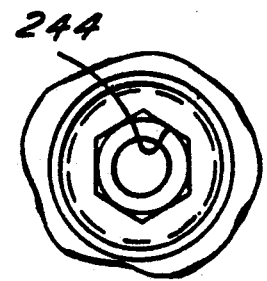
FIG. 13 is end view of the air bearing preloading pin assembly shown in FIG. 12.

Right web support is rigid to front to rear forces since the major dimension cf the webs 170 extend in that direction, but are compliant to side forces since the webs 170 terminate so as to create a gap 172 between the front skirt 156 (FIG. 7).

The bottom of each web support 74, 76 is bolted onto the pads 148, 150 using holes 174 to accommodate bolts.

The post support engages the surface 152 with an interposed thrust bearing 182 insuring free movement in all horizontal directions. A suitable thrust bearing arrangement is shown in U.S. Pat. No. 4,682,418, FIG. 6.

This arrangement thus allows accurate location of the table 14 on the base 32 while accommodating relative thermal expansion.

Figure 10:
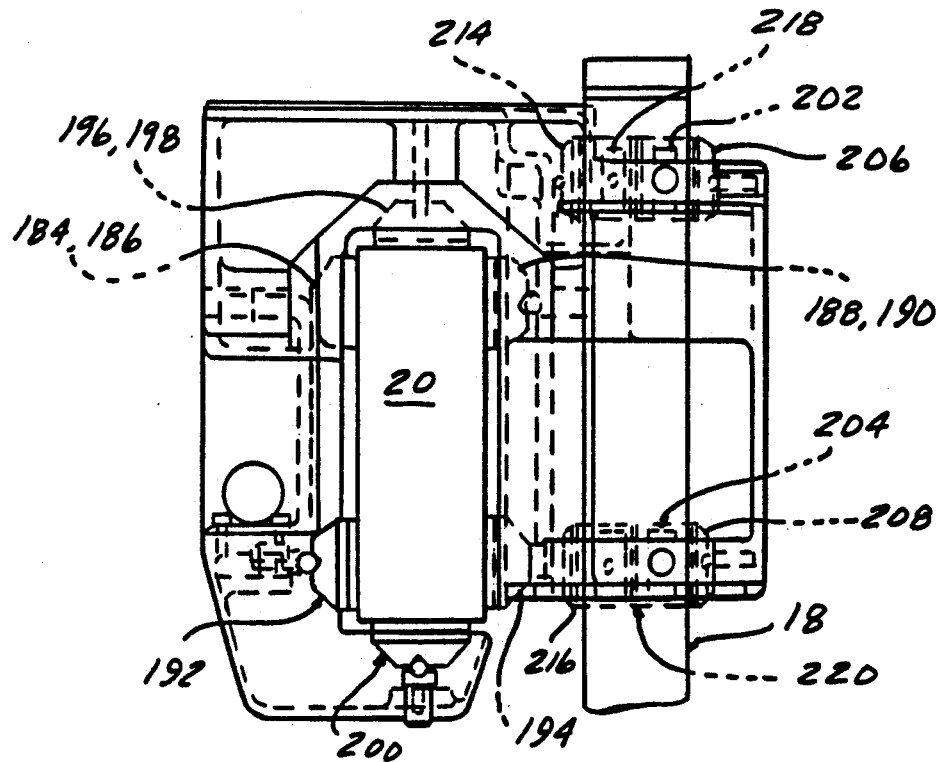
FIG. 10 is an elevational view of the X-axis carriage incorporated in the CMM of FIG. 1 showing the X-axis and probe shaft bearing arrangement.
Figure 11:
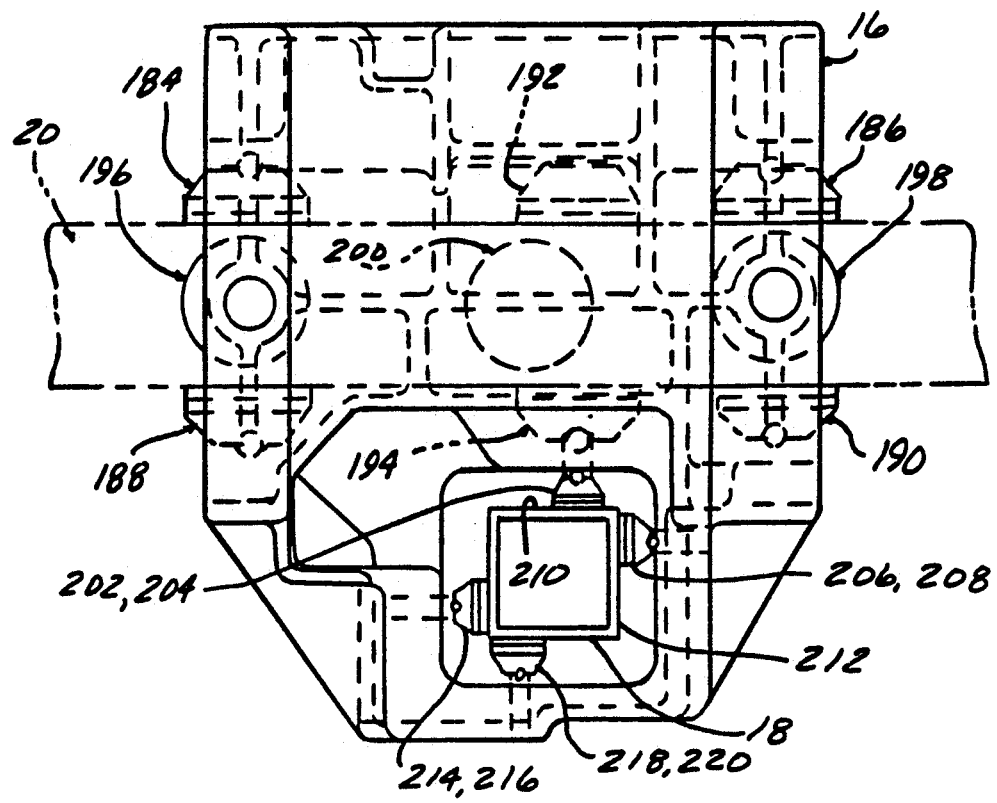
FIG. 11 is a plan view of the Y-axis carriage and probe shaft showing a plan view of the bearing arrangement shown in FIG. 10.

FIGS. 10 and 11 show the bearing arrangement for the X-axis carriage 16 and probe shaft 18. These include fixed upper guide air bearings 184, 186 on the left side of the X-guide rail 20 opposed by aligned preload air bearings 188, 190. A lower preload air bearing 192 is aligned with a lower fixed guide air bearing 194.

A fixed and adjustable air bearing 196, 198 are mounted to face down atop the X guide rail 20, with a preload bearing 200 facing up on the bottom surface.

The probe shaft 18 is guided by two fixed pairs of air bearings 202, 204, 206, 208 aligned along sides 210 212 and two pairs of preload air bearings 214, 216, 218, 220 and the opposite sides.

All of these bearings are mounted on portions of the cast aluminum X-axis carriage 16.

Figure 12:
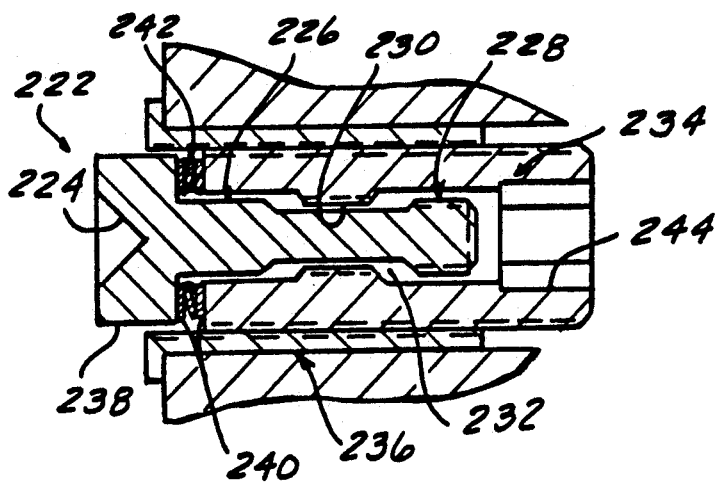
FIG. 12 is a longitudinal sectional view of the air bearing preloading pin assembly used with some of the air bearings.

FIG. 12 shows a preload pin assembly 110. A pin 222 is formed with a conical seat 224 for receiving the ball 88 of an associated air bearing. A reduced diameter stem portion 226 has a thread section 228 formed on the opposite end adapted to mate with an internal thread 230 formed in a bore 232 of a body member 234 threaded into a bushing 236 fixed in a supporting structure. The bore 232 is formed with an enlarged section into which the threaded end 228 passes after advancing entirely through the internal thread 230. This allows free axial movement of the pin 222 in the body member 234 while being retained together.

The pin 222 has an enlarged head 238 which opposes the end face of the body member 234, and interposed therebetween are a pair of hardened wear washers 240 sandwiching a disc spring 242 creating a spring force urging the head 238 outwardly towards the associated air bearing. The disc spring 242 is preferably designed for a constant spring rate to create a stiff bearing support, using a free height to thickness ratio of approximately 0.75 to achieve the constant spring rate.

The rear of the body member is provided with a hex recess 244 allowing a tool to be used to advance the body 234 in the bushing 236 to create a proper preload force.

Figure 14:
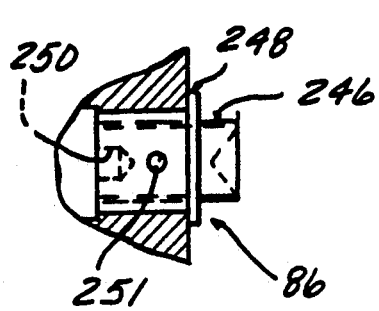
FIG. 14 is a side view of an adjustment pin used with some of the air bearings.

FIG. 14 shows an adjustable pin assembly 86 in which the pin 246 is directly threaded into the bushing 248 fixed in the supporting structure. A hex recess 250 allows adjustment of the pin 246.

Figure 15:
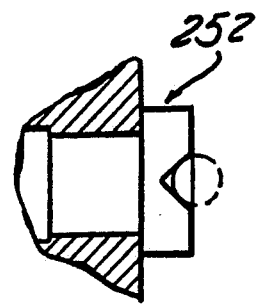
FIG. 15 is a side view of a fixed pin used with some of the air bearings.

A fixed pin is shown in FIG. 15, in which a pin and bushing 252 are integral and fixed in the supporting structure.

We claim:

1. In a coordinate measuring machine of the type including a table mounted on a base, and a probe mounted for movement over said table along a vertical Z-axis and two orthogonal horizontal X, Y axes, an X-axis carriage, Z axis bearing support means for mounting said probe for vertical movement on said X-axis carriage; a Y-axis carriage including a pair of uprights each extending upwardly along either side of said table, an upper cross member extending across said table and connecting the upper ends of said uprights, a lower cross member extending across and below said table and connecting the lower ends of said uprights; X-axis bearing support means for mounting said X-axis carriage for movement along said upper crossmember, Y-axis carriage bearing support means for supporting said Y-axis carriage on said base for movement along said Y-axis, the improvement wherein said Y-axis carriage bearing support means comprises an elongated first guide beam and means fixing said first guide beam at either end to said base to be suspended at either end to extend along one side of said base and parallel to said Y-axis, said first guide beam having defined thereon a bearing surface on each of four sides, two vertical bearing surfaces on opposite inside and outside vertical sides and two horizontal bearing surfaces on a top and bottom side, respectively, a first bearing means facing down on said bearing surface of said top side of said first guide beam, a second bearing means facing in towards said bearing surface of said outside vertical side of said first guide beam, a third bearing means facing up to said bearing surface of said bottom side of said first guide beam, a fourth bearing means facing out on said bearing surface of said inside of said first guide beam, said first, second, third and fourth bearing means all mounted to the lower end of one of said Y-axis carriage uprights; said Y-axis bearing support means further including a second elongated guide beam, means fixing said second guide beam at either end to said base to be suspended at either end extending along the other side of said base, said second guide beam having defined thereon two horizontal bearing surfaces on the top and bottom sides respectively, a fifth bearing means facing down on said second guide beam top side bearing surface and a sixth bearing means facing up on said bottom side bearing surface, said fifth and sixth bearing means mounted to the lower end of the other of said Y-axis carriage uprights and constituting the only Y-axis bearing means acting on said second guide beam.

2. The coordinate measuring machine according to claim 1, wherein all of said bearing means comprise air bearings.

3. The coordinate measuring machine according to claim 1, wherein said means fixing said first guide beam to said base comprises a pair of anchor seats formed at spaced locations along said Y-axis, each anchor seat receiving a respective end of said first guide beam which spans said spacing between said pair of anchor seats.

4. The coordinate measuring machine according to claim 3, wherein said first guide beam comprises a rectangular in section hollow aluminum beam.

5. The coordinate measuring machine according to claim 3, wherein each of said anchor seats are formed with horizontally extending locating features, and wherein said ends of said first guide beam are bonded to a respective anchor seat with the bottom side abutting against a respective locating feature.

6. The coordinate measuring machine according to claim 1, wherein said first bearing means comprises two air bearings spaced along said first guide beam, said second bearing means comprises two air bearings spaced along said first guide beam, said third bearing means comprises a single air bearing aligned intermediate said two air bearings of said first bearing means, said fourth bearing means comprises a single air bearing aligned intermediate said two air bearings of said second bearing means.

7. The coordinate measuring machine according to claim 6, wherein said fifth and sixth bearing means each comprise single air bearings.

8. The coordinate measuring machine according to claim 7, wherein said third, fourth, and sixth bearing means comprises spring preloaded air bearings.

9. The coordinate measuring machine according to claim 1, wherein said first upright lower end includes a bracket portion extending across the bottom and around a side of said first guide beam mounting said third and fourth bearings means.

10. The coordinate measuring machine according to claim 1, wherein said lower crossmember comprises a hollow aluminum beam of substantially greater width than height, either end of which is received within a respective upright and rigidly fixed thereto.

* * * * *